United States Patent
Valero et al.

(10) Patent No.: US 12,483,045 B2
(45) Date of Patent: Nov. 25, 2025

(54) SYSTEM AND METHOD FOR BALANCING USE OF SEVERAL DC/DC CONVERTERS IN A VEHICLE

(71) Applicant: Volvo Truck Corporation, Gothenburg (SE)

(72) Inventors: Maxime Valero, Meyzieu (FR); David De Brito, Charvieu (FR); Frédéric Leroy, Lyons (FR)

(73) Assignee: Volvo Truck Corporation, Gothenburg (SE)

( * ) Notice: Subject to any disclaimer, the term of this patent is extended or adjusted under 35 U.S.C. 154(b) by 558 days.

(21) Appl. No.: 17/982,898

(22) Filed: Nov. 8, 2022

(65) Prior Publication Data

US 2024/0154432 A1 May 9, 2024

(51) Int. Cl.
*H02J 7/00* (2006.01)
*B60L 58/18* (2019.01)
(Continued)

(52) U.S. Cl.
CPC ............ *H02J 7/0016* (2013.01); *G01R 19/10* (2013.01); *G01R 19/12* (2013.01);
(Continued)

(58) Field of Classification Search
CPC .... H02J 7/0016; H02J 2207/20; H02J 7/0013; H02J 1/102; H02J 1/106; G01R 19/10;
(Continued)

(56) References Cited

U.S. PATENT DOCUMENTS 8,598,734 B2 * 12/2013 Kusumi ................. B60L 50/61
903/902
9,733,658 B2 * 8/2017 Vander Laan ........... H02H 9/02
(Continued)

FOREIGN PATENT DOCUMENTS

EP 4215403 A1 * 7/2023 .............. B60L 53/20

OTHER PUBLICATIONS

K. Siri and M. A. Willhoff, "Uniform Current/Voltage-Sharing for Interconnected DC-DC Converters," 2007 IEEE Aerospace Conference, Big Sky, MT, USA, 2007, pp. 1-17 (Year: 2007).*
(Continued)

*Primary Examiner* — M Baye Diao
(74) *Attorney, Agent, or Firm* — Withrow & Terranova, PLLC (57) ABSTRACT

A method to control operation of electrical converter units in an electrical system of a vehicle comprising a first and a second electrical network, the first and the second electrical network being coupled respectively to a positive terminals of a first battery and a second battery, each converter of a plurality of converters having an active state in which the converter output supplies current to the second electrical network, and a rest state in which the converter output does not supply current to the second electrical network, each converter of the plurality of converters exhibiting a respective cumulative operation time in each of a plurality of different current ranges, wherein a single converter is active in a vehicle rest mode, and a balance of converters is carried out upon cumulative respective usage of each converter.

19 Claims, 3 Drawing Sheets

(51) Int. Cl.
*G01R 19/10* (2006.01)
*G01R 19/12* (2006.01)
*G01R 19/165* (2006.01)

(52) U.S. Cl.
CPC ........ *G01R 19/16571* (2013.01); *B60L 58/18* (2019.02); *H02J 2207/20* (2020.01)

(58) Field of Classification Search
CPC ... G01R 19/12; G01R 19/16571; B60L 58/18; B60L 2210/10; B60L 58/20; B60L 58/22; H02M 3/00; B60R 16/0315; B60R 16/033
USPC ......................................................... 320/122
See application file for complete search history.

(56) References Cited

U.S. PATENT DOCUMENTS

| | | | |
|---|---|---|---|
| 11,584,257 B2 * | 2/2023 | Valero | H02J 7/0048 |
| 2013/0141040 A1 * | 6/2013 | DeBoer | B60L 53/62 |
| | | | 320/109 |
| 2013/0335004 A1 * | 12/2013 | Peuser | H02J 1/08 |
| | | | 320/103 |
| 2022/0029428 A1 * | 1/2022 | Ino | H02J 1/102 |

OTHER PUBLICATIONS

M. Evzelman, M. M. Ur Rehman, K. Hathaway, R. Zane, D. Costinett and D. Maksimovic, "Active Balancing System for Electric Vehicles With Incorporated Low-Voltage Bus," in IEEE Transactions on Power Electronics, vol. 31, No. 11, pp. 7887-7895 (Year: 2015).*

* cited by examiner

SYSTEM AND METHOD FOR BALANCING USE OF SEVERAL DC/DC CONVERTERS IN A VEHICLE

FIELD OF THE DISCLOSURE

The present disclosure relates to systems and methods for balancing use of several DC/DC converters in a vehicle.

BACKGROUND OF THE DISCLOSURE

In the field of heavy-duty vehicles, it is common to find a first electrical network (e.g. 24 V) having a first nominal voltage and coupled to a first battery (BAT1) and a second electrical network (e.g. 12 V), having a second nominal voltage and coupled to a second battery (BAT2), this configuration is often referred to as 'dual voltage architecture'.

Recharging is usually done through the first electrical network and therefore one or more of DC/DC converters are needed to supply the second electrical network. When two or more DC/DC converters are used in parallel, the problem of balancing the power supplied by the respective DC/DC converters arises. Also, when the power requirement is not too high, it may be decided to activate only one DC/DC converter, and let the other ones stopped.

The inventors have sought to propose an improved solution to minimize the energy consumption and to increase the lifetime of DC/DC converters, at least in some vehicle operation modes.

SUMMARY OF THE DISCLOSURE

According to one aspect, it is provided method to control operation of electrical converter units in an electrical system of a vehicle comprising a first electrical network (Ntw1) and a second electrical network (Ntw2), the first electrical network being coupled to a positive terminal of first battery (BAT1) having a first nominal voltage (Vn1), the second electrical network being coupled to a positive terminal of second battery (BAT2) having a second nominal voltage (Vn2) lower than the first nominal voltage, wherein the electrical system comprises a plurality of converters (C1, C2, C3 . . . Cn) with a first converter (C1) and one or more further converters (C2, C3 . . . Cn),

- each converter of the plurality of converters being supplied from the first electrical network (Ntw1) and having a converter output coupled to the second electrical network (Ntw2),
- each converter of the plurality of converters having an active state in which the converter output supplies current to the second electrical network (Ntw2), and a rest state in which the converter output does not supply current to the second electrical network (Ntw2),
- each converter of the plurality of converters exhibiting a respective cumulative operation time in each of a plurality of different current ranges (R1, R2, R3, . . . , RN), the method comprising:

S1/ Entering a vehicle rest mode with all converters of the plurality of converters in a rest state, S2/ Measuring an instant voltage (Vu2) prevailing at the second electrical network and/or a reference current (Icr) flowing through a bypass circuit (18) provided in the first converter, S3/ if the instant voltage (Vu2) prevailing at the second electrical network meets an equalization activation condition or the reference current flowing through the bypass circuit (18) exceeds a first current threshold (Ith1), then starting an equalizing sequence wherein the first converter (C1) changes from rest state to active state, S4/ measuring continuously an instant current (Ix) supplied to the second electrical network (Ntw2) by the plurality of converters, and determine a current range in which the instant current lies, forming thereby a currently active current range (R1; R2; R3; . . . , RN), S5/ If the first converter (C1) is not the converter having the least respective cumulative operation time among the plurality of converters in the currently active current range, then stopping the first converter and activate a selected one of the further converters, wherein the selected one of the further converters is chosen to be the one having the least respective cumulative operation time in said currently active current range and becomes the single currently active converter, S6/ if the instant current (Ix) changes from the currently active current range to a further current range, then causing the selected one of the plurality of converters to be the one having the least respective cumulative operation time in the further current range.

Advantageously, the strategy is designed to balance the use of the different converters, so that their respective remaining lifetime are substantially equal. It therefore decreases the risk of premature failure of one converter.

The term "equalizing sequence" should be construed as a sequence in which current is supplied from one converter to the second electrical network and its battery, this current helps supply electrical energy to loads L2,L3 and to recharge the second battery BAT2.

Also, at any time of the vehicle rest mode, no more than one converter is active at one moment in time. If no equalizing sequence is ongoing, all converter are OFF and the electrical energy supplied to loads L2,L3 is coming only from the second battery BAT2.

If an equalizing sequence is ongoing, a single converter of the plurality of converters is in the active state, the other converters are OFF and do not spend energy.

We note here that the above-mentioned converters are in practice DC/DC converters, e.g. step-down converters.

Under the so called "vehicle rest mode", it should be understood a vehicle operation mode with engine stopped, and generator not providing any current to recharge the first battery. It should be noted that outside the "vehicle rest mode", for example under engine running, more than one converter can be in the active state simultaneously, since more power can be required on the second electrical network from various implements or ancillary equipment.

As further note, at step S4/, in the locution "an instant current (Ix) supplied to the second electrical network (Ntw2) by the plurality of converters", the index 'x' in Ix refers to the currently active converter Cx. If the first converter is active, Ix is to be interpreted as I1, if the second converter C2 is active, Ix is to be interpreted as I2, if the third converter C3 is active, Ix is to be interpreted as I3, etc.

As further note, step S6/ can be repeated. At each change of current range, a new decision can be taken, and the currently active converter can continue in active operation or another converter can be selected to replace the current one, in which case, the previous one is stopped (going to rest state) and the new one is activated (going to active state).

Also, it should be noted that the bypass circuit is optional within the first converter and therefore the clause "reference current (Icr) flowing through a bypass circuit" can be irrelevant (not applicable).

In various embodiments of the disclosure, one may possibly have recourse in addition to one and/or other of the following arrangements, taken alone or in combination.

According to one option, the method may further comprise: S7/ whenever an outputted current stays in a same current range for more than a predefined time (PT1), take again a decision causing an activation of a selected converter of the plurality of converters having the least respective cumulative operation time in the currently active current range. Said otherwise, the choice of the least used converter can be repeated continuously during the use and a new decision can be taken after a while within the same current range. The same converter or another one can be selected and the system may switch from one converter to another.

According to one option, the method may further comprise: S8/ if an instant current (Ix) outputted from the currently active converter meets a deactivation criterium, then stopping the equalizing sequence.

For example, if the current is low and rather steady, the operation of the single active converter can be stopped and the equalizing sequence comes to an end (all converters are OFF).

According to one option, even though the equalizing sequence has been stopped, understand circumstantial condition, the equalizing sequence can be reactivated in the same vehicle at rest mode.

According to one option, the method may further comprise:
SA/ Defining a partition of a max current rating into a plurality of different current ranges (R1, R2, R3, ..., RN),
SB/ Recording a cumulative operation time of each converter (C1-Cn) in each current range.

This is a somehow simple calculation.

According to one option, each current range is adjacent to one another. For example the overall current range [0 to Imax] is partitioned into: R1[0,ii1], R2[ii1,ii2], R3[ii2,ii3], R4[ii3,ii4], ... and Rn[ii(n−1),iin].

According to one option, the equalization activation condition is defined as Vu1−2Vu2>Vth1, where:
Vu1 being an instant voltage prevailing at the first electrical network.
Vu2 being an instant voltage prevailing at the second electrical network
Vth1 being a predefined threshold.

An equalizing sequence is triggered upon the condition Vu1−2Vu2>Vth1 becomes true.

According to one option, the predefined threshold Vth1 can be comprised between 0.1V and 0.3V.

According to one option, the deactivation criterium can be defined as:

$Ix < Ith{deact}$ and $dIx/dt < Delta{Ith}$,

Wherein Ix is the instant current (Ix) of the currently active converter and dIx/dt is the time derivative thereof,
Ithdeact is a second predefined threshold,
DeltaIth is a third predefined threshold.

Advantageously, an ongoing equalizing sequence can be stopped upon value and trend of the supplied current (low value and somewhat steady current).

According to one option, the second predefined threshold Ithdeact can be comprised between 3 A and 5 A. The third predefined threshold DeltaIth can be comprised between 0.4 A/15 min 0.6 A/15 min.

According to one option, each converter of the plurality of converters can be activated or stopped from a master controller. The master controller can keep track of the cumulative operation time for each converter, and thereupon decide which converter should be activated.

According to one option, an equalizing sequence can be started from the master controller or from a local controller within the first converter.

According to one option, the local controllers of the converters and the master controller can communicate via a CAN bus or any other communication network. However, a communication is only taking place whenever a switch of converter is required, or a change of state of one converter. During the rest of the time, few or no communication takes place, thereby decreasing electrical consumption.

The present disclosure is also directed at an electrical power supply system for a vehicle comprising a first electrical network (Ntw1) and a second electrical network (Ntw2), the first electrical network being coupled to a positive terminal of first battery (BAT1) having a first nominal voltage (Vn1), the second electrical network being coupled to a positive terminal of second battery (BAT2) having a second nominal voltage (Vn2) lower than the first nominal voltage, wherein the electrical system comprises a master controller and a plurality of converters (C1, C2, C3 ... Cn) each having a local controller and, the plurality of converters comprising a first converter (C1) and one or more further converters (C2, C3 ... Cn), each converter of the plurality of converters being supplied from the first electrical network (Ntw1) and having a converter output coupled to the second electrical network (Ntw2), each converter of the plurality of converters having an active state in which the converter output supplies current to the second electrical network (Ntw2), and a rest state in which the converter output does not supply current to the second electrical network (Ntw2), each converter of the plurality of converters exhibiting a respective cumulative operation time in each of a plurality of different current ranges (R1, R2, R3, ..., RN), the local controller and the master controller being configured to cause under a vehicle rest mode:

S2/ Measuring an instant voltage (Vu2) prevailing at the second electrical network and/or a reference current (Icr) flowing through a bypass circuit (18) provided in the first converter (C1), S3/ if the instant voltage prevailing at the second electrical network meets an equalization activation condition or the reference current flowing through the bypass circuit (18) exceeds a first current threshold (Ith1), then starting an equalizing sequence wherein the first converter (C1) changes from rest state to active state, S4/ measuring continuously an instant current (Ix) supplied to the second electrical network (Ntw2) by the plurality of converters, and determine a current range in which the instant current lies, forming thereby a currently active current range (R1, R2, R3, ..., Rk), S5/ If the first converter (C1) is not the converter having the least respective cumulative operation time among the plurality of converters in the currently active current range, then stopping the first converter and activate a selected one of the further converters, wherein the selected one of the further converters is chosen to be the one having the least respective cumulative operation time in said currently active current range and becomes the single currently active converter, S6/ if the instant current (Ix) changes from the currently active current range to a further current range, then causing the selected one of the plurality of converters to be the one having the least respective cumulative operation time in the further current range.

Same notes and advantages as per corresponding method claim are also applicable here.

According to one option, there may be provided: S7/ whenever an outputted current stays in a same current range for more than a predefined time (PT1), take again a decision causing an activation of a selected converter of the plurality of converters having the least respective cumulative operation time in the currently active current range. Said otherwise, the choice of the least used converter can be repeated continuously during the use and a new decision can be taken. The same converter or another one can be selected and the system may switch from one converter to another. PT1 can be rather short like 5 or 10 minutes.

According to one option, there may be provided: S8/ if an instant current (Ix) outputted from the currently active converter meets a deactivation criterium, then stop the equalizing sequence.

For example, if the current is low and rather steady, the operation of the single active converter can be stopped and the equalizing sequence comes to an end.

According to one option, the first nominal voltage (Vn1) is 24 Volts, and the second nominal voltage (Vn2) is 12 Volts. This dual voltage configuration is suitable for heavy duty vehicles, busses and trucks.

According to one option, the first network can be selectively supplied by an alternator when a vehicle engine is running. This is a case for a motion vehicle with internal combustion engine.

According to one option, the first network is selectively supplied from an electrical traction battery having a third nominal voltage higher than the first nominal voltage. The system discussed above is also applicable to a hybrid vehicle or a Zero Emission (electrical) vehicle.

According to one option, the local controllers and the master controller communicate via a CAN bus. This is a cost-effective solution and offer a wide variety of possibilities so that local controllers and the master controller can efficiently cooperate.

According to one option, each converter of the plurality of converters can be activated or stopped from the master controller. The master controller can keep track of the cumulative operation time for each converter, and thereupon decide which converter should be activated.

According to one option, each converter of the plurality of converters comprise a local controller and a current sensor (21,22,23) to measure the current (I1,I2, I3) outputted at the converter output.

The present disclosure is also directed at a vehicle comprising at least an electrical power supply system as described above.

According to a different aspect, the present disclosure is also directed at a method to control operation of electrical converter units in an electrical system of a vehicle comprising a first electrical network (Ntw1) and a second electrical network (Ntw2), the first electrical network being coupled to a positive terminal of first battery (BAT1) having a first nominal voltage (Vn1), the second electrical network being coupled to a positive terminal of second battery (BAT2) having a second nominal voltage (Vn2) lower than the first nominal voltage, wherein the electrical system comprises a plurality of converters (C1, C2, C3 . . . Cn) with a first converter (C1) and one or more further converters (C2, C3 . . . Cn), each converter of the plurality of converters being supplied from the first electrical network (Ntw1) and having a converter output coupled to the second electrical network (Ntw2),
each converter of the plurality of converters having an active state in which the converter output supplies current to the second electrical network (Ntw2), and a rest state in which the converter output does not supply current to the second electrical network (Ntw2),
each converter of the plurality of converters exhibiting a respective cumulative usage,
the method comprising:
S1/ Entering a vehicle rest mode with all converters of the plurality of converters in a rest state,
S2/ Measuring an instant voltage prevailing at the second electrical network and/or a reference current (Icr) flowing through a bypass circuit (18) provided in the first converter (C1),
S3/ if the instant voltage prevailing at the second electrical network meets an equalization activation condition or the reference current flowing through the bypass circuit (18) exceeds a first current threshold (Ith1), then starting an equalizing sequence wherein the first converter (C1) changes from rest state to active state,
S40/ provide a single converter operation under the equalizing sequence, causing an activation of a single selected converter having the least respective cumulative usage among the plurality of converters.

The term "cumulative usage" should be construed as a metric representative of the time spent in operation together with the current supplied.

According to one option, for each converter of the plurality of converters the cumulative usage can be calculated as a fatigue function: $\int_0^{now} Ix \cdot F(Ix) \cdot t \cdot dt$. Advantageously, the function F can reflect weighting coefficient according to current intensity and associated damage. This calculation is an alternative to partitioning the overall current range in the plurality of current ranges, as discussed above.

All the other optional aspects and also be applied to the example discussed above with the calculation of cumulative usage.

BRIEF DESCRIPTION OF THE DRAWINGS

Other features and advantages of the disclosure appear from the following detailed description of one of its embodiments, given by way of non-limiting example, and with reference to the accompanying drawings, in which.

DETAILED DESCRIPTION

Aspects set forth below represent the necessary information to enable those skilled in the art to practice the disclosure. In the figures, the same references denote identical or similar elements.

Figure 1:
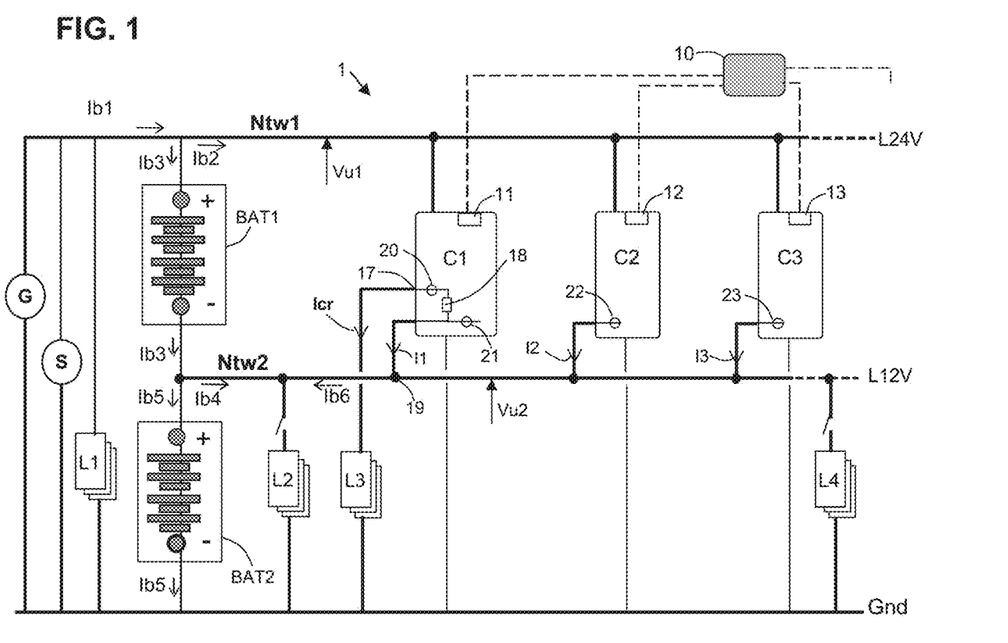
FIG. 1 is an electrical diagram of a system according to the present disclosure.

As apparent from FIG. 1, a schematic electrical diagram is shown. The depicted system can be used in a truck, a bus, or any heavy-duty vehicle. The vehicle can tow a trailer which is also electrically supplied from the tractor/truck.

In the promoted system, there is provided a 'dual voltage architecture' with two electrical networks having different voltages. There is provided a first electrical network Ntw1 having a first nominal voltage Vn1, e.g. 24 V and a second electrical network Ntw2 having a second nominal voltage Vn2 e.g. 12 V.

Generally speaking, the second nominal voltage Vn2 is lower than the first nominal voltage Vn1. In an exemplary configuration Vn1 is twice Vn2, but however any other factor is encompassed within the scope of this disclosure.

It is also worth noting that the voltage prevailing in the first electrical network can vary around the nominal voltage. If the first nominal voltage Vn1 is 24 V, the real voltage prevailing in the first electrical network can be comprised within the range 18V-28V. In a similar manner, the voltage prevailing in the second electrical network can vary around the nominal voltage. If the second nominal voltage Vn2 is 12 V, the real voltage prevailing in the first second t electrical network can be comprised within the range 9V-14V.

Regarding now the vehicle at stake, it can be a vehicle comprising an internal combustion engine, or it can be a hybrid vehicle or it can be a ZEV (electrical only).

In the example shown at FIG. 1, the electrical system is applied to a vehicle having an internal combustion engine. The engine comprises a starter motor denoted S and an alternator denoted G. As illustrated, both the starter motor S and the alternator G are connected to the first electrical network Ntw1. Also connected to the first electrical network Ntw1 are various loads denoted L1. L1 are known as "24V loads" in case of a dual voltage 24V/12V.

The first electrical network Ntw1 is coupled to a first battery BAT1. The second electrical network Ntw2 is coupled to a second battery BAT2. The first battery BAT1 has a positive terminal coupled to the first electrical network Ntw1 and a negative terminal coupled to the second electrical network Ntw2. The second battery BAT2 has a positive terminal coupled to the second electrical network Ntw2 and a negative terminal coupled to the ground denoted Gnd. This can be called a 'cascaded' configuration.

In the illustrated example, BAT1 and BAT2 have substantially the same voltage characteristics, but of course it could be otherwise.

Here, the voltage Vu2 denotes the voltage prevailing in the the second electrical network Ntw2 and Vu1 denotes the voltage prevailing in the first electrical network Ntw1.

The electrical system comprises a plurality of converters (C1, C2, C3 . . . Cn). The plurality of converters comprises a first converter C1 and one or more further converters (C2, C3 . . . Cn). As discussed later on, the first converter C1 can be identical to the further converters; however, in exemplary configurations, first converter C1 is different from the further converters.

The converters are DC/DC converters to step down voltage from Vu1 to Vu2. Any type of stepdown converter is considered, regarding the internal arrangement of power switches.

Each converter has a local controller, e.g. C1 has a local controller denoted 11, C2 has a local controller denoted 12, C3 has a local controller denoted 13 etc . . . .

Each converter Cj (j stands for an index 1 to n) is supplied from the first electrical network Ntw1 and has an output coupled to the second electrical network Ntw2.

Each converter has a current sensor. With the current sensor, the current outputted by the converter can be measured. The type of current sensor can be any type, e.g. magnetic loop, shunt, etc. . . . . First converter C1 has a current sensor denoted 21. Second converter C2 has a current sensor denoted 22. Third converter C3 has a current sensor denoted 23 . . . .

For each converter, the current sensor 2$i$ is connected to the local controller 1$i$. Further, the local controller 1$i$ comprises means immediately voltage Vu2 prevailing at least at the second electrical network.

The electrical system comprises a master controller 10. The master controller 10 can communicate with local controllers 11,12,13 through a CAN bus, a Lin bus, an Ethernet bus, or any like solutions for data bus.

Each local controller may receive output voltage setpoint from the master controller. The local controller may receive other parameters or orders from the master controller of output. The current output is limited to Imax by internal limitations. Generally speaking, when the converter is activated, operation parameters (voltage and current setpoints) are defined by a local decision based by local parameters (like temperature) and upon data received from the master controller.

Each converter of the plurality of converters has an active state in which the converter output supplies current to the second electrical network Ntw2, and a rest state in which the converter output does not supply current to the second electrical network Ntw2. In the rest state (OFF state), the electrical consumption of the converter is very small.

Given the cascaded connection of the batteries, if the batteries are similar and well balanced, Vu1=2×Vu2, at least when the alternator G and the converters are stopped.

The second electrical network supplies some loads L2.

Loads L2 can be permanent or intermittent. Among loads L2 we can find lighting devices, wiping motors, HVAC blower, instrument cluster/panel, engine control, ABS control, airbag control, etc. . . . . It should be noted that part or all of above mentioned loads can also be connected to the first electrical network Ntw1, i.e. among loads denoted L1 (instead of L2).

At least some the loads L2 can be coupled to a network portion arranged downstream IGN ignition switch or relay, in which case they are not supplied any more while ignition is OFF.

Further, there are other loads denoted L4, possibly connected to a trailer or bodybuilder functions or optional equipment.

Said otherwise, the electrical loads present on the complete truck comprise electrical loads which are part of the original equipment truck (OEM loads) and electrical loads that are added later by a bodybuilder company implementing the final function intended for the truck (e.g. trash compactor, refrigerated cargo, dump truck, winch and crane, . . . ). Also the truck driver can also plug additional equipment like a fridge, a TV set, etc. . . . which constitute extra loads.

In a situation when the batteries are recharged from the alternator, a primary current Ib1 is flowing from the generator/alternator G into the first electrical network Ntw1. This primary current is divided into a portion Ib2 used directly by the first network and another portion Ib3 flowing through the first battery BAT1. The portion Ib3 flowing through the first battery is itself divided downstream into a portion Ib4 used directly by the second network Ntw2 and another portion Ib5 flowing through the second battery.

When the converters are not supplying current, Ib4 is positive from the battery BAT2 to the loads L2, L4. Consequently, the recharging current Ib5 for the second battery is less than the recharging current Ib3 for the first battery. This contributes to unbalance the batteries. Generally speaking, also the loads L2, L4 drawing current from the second electrical network contribute to unbalance the batteries.

When the engine is running and the truck is driven, there is often a higher current draw in the 12V loads L2. Under this configuration, more than one converter C1-Cn are concurrently activated to supply an operating current Ib6 to the loads L2.

The first converter, when activated, supplies current to the second electrical network at connection point 19. Said current is measured by sensor 21. Each of the further converters C2,C3, . . . when activated, supplies current to the second electrical network Ntw2 at their respective connection point.

Special Feature of C1

In the exemplary implementation shown at FIG. 1, the first converter C1 comprises an auxiliary reference output 17, which is a dedicated supply of the loads L3. L3 loads are 12V loads in the shown example. There may be cabin related loads. The first converter C1 comprises a shunt circuit 18. Shunt circuit 18 can provide loss of ground protection function.

A current can be received from the second electrical network at the connection point 19, the current then flows through the shunt circuit 18 and then supplies loads L3 through the auxiliary reference output 17.

There is provided an auxiliary current sensor 20 upstream the auxiliary reference output 17. Said auxiliary current sensor 20 measures the current flowing through the shunt circuit 18 and into the loads L3, even though the first converter is in a rest state and does not supply any current.

The current Icr flowing through the auxiliary circuit is not controlled by the first converter, although current Icr flows inside the first converter. The current sensor 20 measures Icr.

Further Converters and Current Ranges

Figure 2:
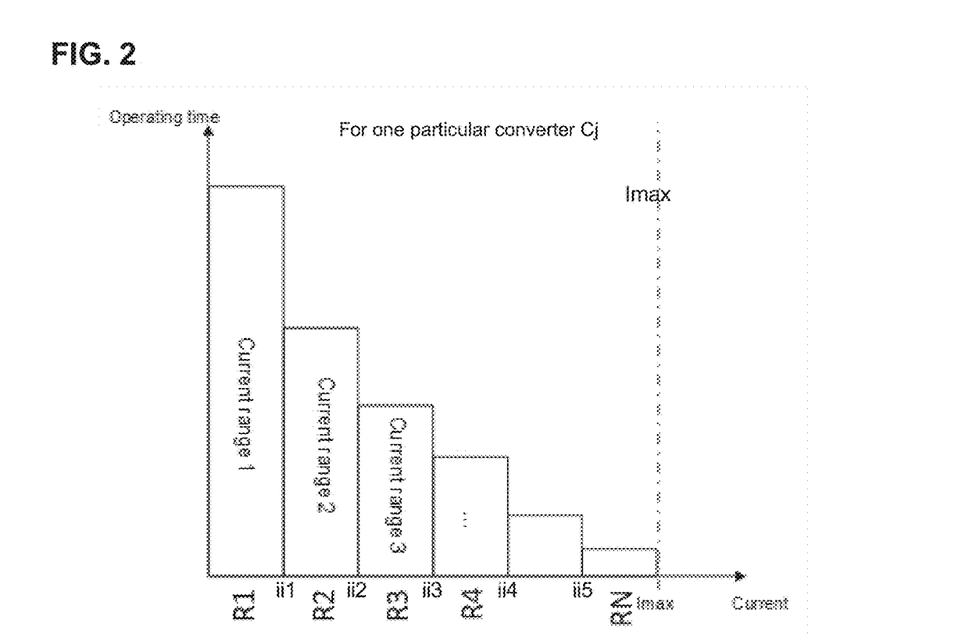
FIG. 2 illustrates current range partitioning.

Advantageously to one aspect of the disclosure, as illustrated at FIG. 2, there are defined a plurality of different current ranges R1, R2, R3, . . . , RN.

For example, the first current range R1 lies from 0 to ii1. IR1 can be comprised between 4 A and 8 A. For example, the second current range R2 lies from ii1 to ii2. Ii2 can be comprised between 6 A and 10 A. For example, the $N^{th}$ current range lies from ii(N−1) to Imax.

In some examples, N can be comprised between 4 and 10, preferably between 4 and 6.

In one otherwise formulated example, each current range is adjacent to one another. For example the overall current range [0 to Imax] is partitioned into: R1[0,ii1], R2[ii1,ii2], R3[ii2,ii3], R4[ii3,ii4], . . . and Rn[ii(n−1),iin], with iin=Imax.

In one particular example, the max current rating is the same for all converters. However, in other examples, max current rating can differ from one converter to another.

Functionality

Each converter of the plurality of converters exhibits a respective cumulative operation time in each of a plurality of different current ranges (R1, R2, R3, . . . , RN).

Figure 3:
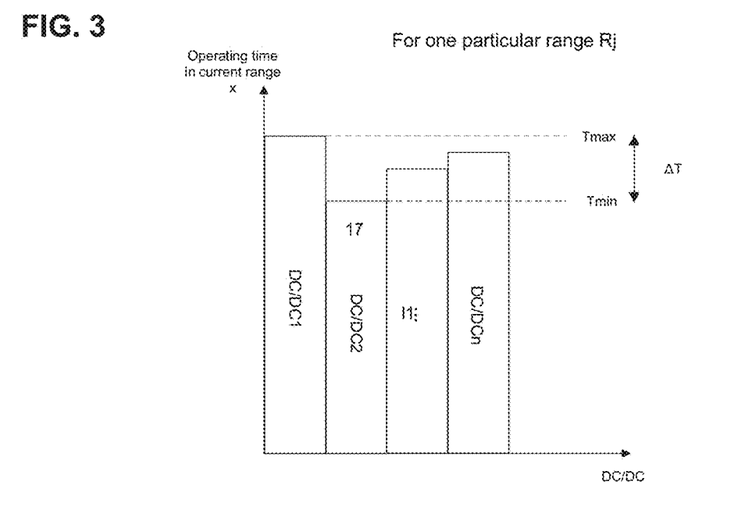
FIG. 3 illustrates a chart with different cumulative times in one particular current rent current range.

The calculation of the cumulative operation time is preferably implemented in the master controller 10. The master controller therefore keeps updating a matrix/table of cumulative operation time. If there is N ranges is and K converters, matrix/table has a N×K dimension. Time values can be expressed in minutes or in multiple o minutes. The memory size to store such a matrix is rather small. This matrix/table is continuously updated by the master controller and is used as a lookup table to select the more appropriate converter to activate in the rest mode.

According to an alternative implementation, we don't necessarily use a logic of current ranges but instead a cumulative usage can be computed for each converter. More precisely, in one exemplary implementation, the master controller calculates the cumulative usage CU of each converter as a fatigue function, such as $CU=\int_0^{now} Ix \cdot F(Ix) \cdot t \cdot dt$. The function F reflects weighting coefficient according to current intensity and associated damage.

Under a special operating mode of the vehicle, referred to as "rest mode" in the present disclosure, no more than one converter is activated at one given time. More precisely there can a single active converter in said rest mode or there can be no converter activated at all.

In practice, just after entering the rest mode, all converters of the plurality of converters are in a rest state.

However, when the rest mode is started, the by default converter at stake is the first converter C1.

When the vehicle enters the rest mode, the method includes (step S2/): measuring an instant voltage Vu2 prevailing at the second electrical network. This is done in the first converter C1.

Further, optionally, in C1 is measured a reference current Icr flowing through a bypass circuit 18 provided in the first converter C1, when this bypass circuit is present.

The promoted method includes (step S3/): if the instant voltage Vu2 prevailing at the second electrical network meets an equalization activation condition or optionally the reference current flowing through the bypass circuit 18 exceeds a first current threshold Ith1, then starting an equalizing sequence wherein the first converter C1 changes from rest state to active state.

In practice, an equalizing sequence is needed when the second battery BAT2 needs help supplying electrical loads connected to the second electrical network.

During such an equalizing sequence, a current Ix (I1,I2, I3, . . . ) is supplied from one converter to the second electrical network and its battery, this current helps supply electrical energy to loads L2,L3 and to recharge the second battery BAT2.

In one example, the equalization activation condition is defined as Vu1−2Vu2>Vth1. The predefined threshold Vth1 can be comprised between 0.1V and 0.3V The equalizing sequence is also started when substantial current is flowing through the bypass circuit 18, namely Icr>Ith1.

In one example, the first current threshold Ith1 is chosen between 3 A and 5 A.

Therefore, there are provided a voltage criterium and a current criterium to start the equalizing sequence.

Figure 5:
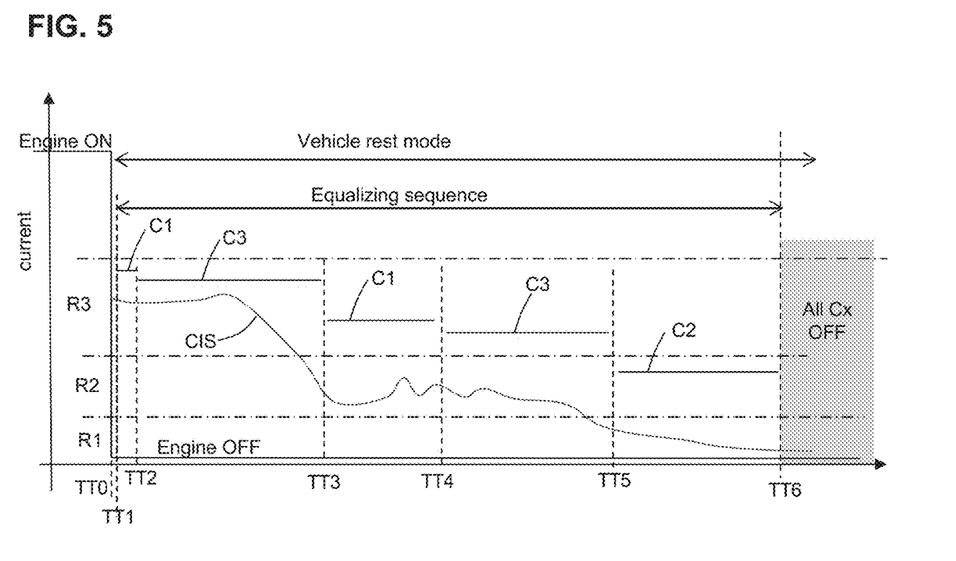
FIG. 5 shows an exemplary time chart.

As illustrated at FIG. 5, in the example described, when the equalizing sequence is started, the first converter C1 is always started first to supply current Ib6 to the second electrical network Ntw2. However, one goal of the present disclosure is to balance the use of each converter and therefore the method promotes to provide a single converter operation under the equalizing sequence, causing an activation of a single selected converter having the least respective cumulative usage among the plurality of converters. S40.

As already mentioned above, in one specific example, for each converter of the plurality of converters the cumulative usage CU can be calculated as a fatigue function $CU=\int_0^{now} Ix \cdot F(Ix) \cdot t \cdot dt$, where the function F can reflect a weighting coefficient according to current intensity and associated damage. The master controller selects the converter having the lower CU value. Then, for the selected converter, the CU will increase along with operating time.

According to another implementation, illustrated at FIGS. 2 and 3, the method promotes to measure continuously an instant current (Ix) supplied to the second electrical network (Ntw2) by the plurality of converters, and determine a current range Rj in which the instant current lies, forming thereby the currently active current range.

Then, as illustrated at figure, the master controller 10 compares cumulative operation time of each converter in this particular currently active current range.

The promoted method includes:

S5/ If the first converter C1 is not the converter having the least respective cumulative operation time among the plurality of converters in the currently active current range, then stopping the first converter and activate a selected one of the further converters.

The selected one of the further converters is chosen to be the one having the least respective cumulative operation time in said currently active current range Rj. Thus, the selected one of the further converters becomes the single currently active converter.

The promoted method includes:

S6/ if the instant current Ix changes from the currently active current range to a further current range Rk, then causing the selected one of the plurality of converters to be the one having the least respective cumulative operation time in the further current range Rk.

The promoted method includes:

As further note, step S6/ can be repeated. At each change of current range, a new decision can be taken, and the currently active converter can continue in active operation or another converter can be selected to replace the current one, in which case, the previous one is stopped (going to rest state) and the new one is activated (going to active state).

The promoted method includes:

S7/ whenever an outputted current stays in a same current range for more than a predefined time (PT1), take again a decision causing an activation of a selected converter of the plurality of converters having the least respective cumulative operation time in the currently active current range. Said otherwise, the choice of the least used converter can be repeated during the use and a new decision can be taken after a while within the same current range. The same converter or another one can be selected and the system may switch from one converter to another.

It should be noted that, in order to avoid frequent switches, there may be provided a hysteresis mechanism, for example a switchover of converter is triggered only if there is a difference in the operating time within the considered current range of at least ten minutes.

It may happen that the equalizing sequence is not needed anymore. Therefore, the method may further comprise: S8/ if the instant current Ix outputted from the currently active converter meets a deactivation criterium, then stopping the equalizing sequence.

In one exemplary aspect, the deactivation criterium can be defined as:

$$Ix < Ith_{deact} \text{ and } dIx/dt < Delta Ith,$$

Wherein Ix is the instant current and dIx/dt is the time derivative thereof,

Ithdeact is a second predefined threshold,

DeltaIth is a third predefined threshold.

Advantageously, an ongoing equalizing sequence can be stopped upon value and trend of the supplied current (low value and somewhat steady current).

According to one option, the second predefined threshold Ithdeact can be comprised between 3 A and 5 A. The third predefined threshold DeltaIth can be comprised between 0.4 A/15 min 0.6 A/15 min.

It should be noted that in addition to the conditions already discussed, an equalizing sequence can be started from the master controller, each converter of the plurality of converters can be activated or stopped from a master controller. This kind of logic can be followed in particular in case of discrepancies or trouble in the current sensing function.

Turning now to the time chart of FIG. 5, CIS denotes the current supplied by the converter(s) currently at work to the second electrical network.

TT0 denotes an instant when the engine is off. In this example at the same time begins the vehicle rest mode of interest. Shortly after, in the shown example, at TT1 the equalizing sequence is started with first converter C1 in the active state. The master controller runs the algorithm discussed above to select which one of the converters to activate in order to achieve a balance usage of all the converters. In this case C3 is selected, in the current range R3. Around instant TT2, first converter C1 is stopped (going to rest state) and the third converter C3 is activated. After a while the current draw CIS decreases, and the current lies within a lower current range R2. The master controller runs the algorithm discussed above and decide to select the first converter for the new current range. Around instant TT3, third converter C3 is stopped (going to rest state) and the first converter C1 is activated again. We note here that there may be discontinuities in the current supply to Ntw2, since the second battery BAT2 acts as a buffer supplier.

Before TT4, staying in the same current range, the master controller decides to select the third converter C3. Around instant TT4, first converter C1 is stopped (going to rest state) and the third converter C3 is activated.

After a while the current draw CIS further decreases and the current lies within a further lower current range R1. The master controller runs the algorithm discussed above and decide to select the first converter for the new current range, C2 is the selected one. Around instant TT5, third converter C3 is stopped and the second converter C2 is activated.

Just before instant TT6, the supplied current in such that deactivation criterium is met. Therefore, second converter is stopped and the equalizing sequence is finished.

Of course, it is considered that if the current draw increases again, a new equalising sequence is started.

OTHER EXAMPLES

Figure 4:
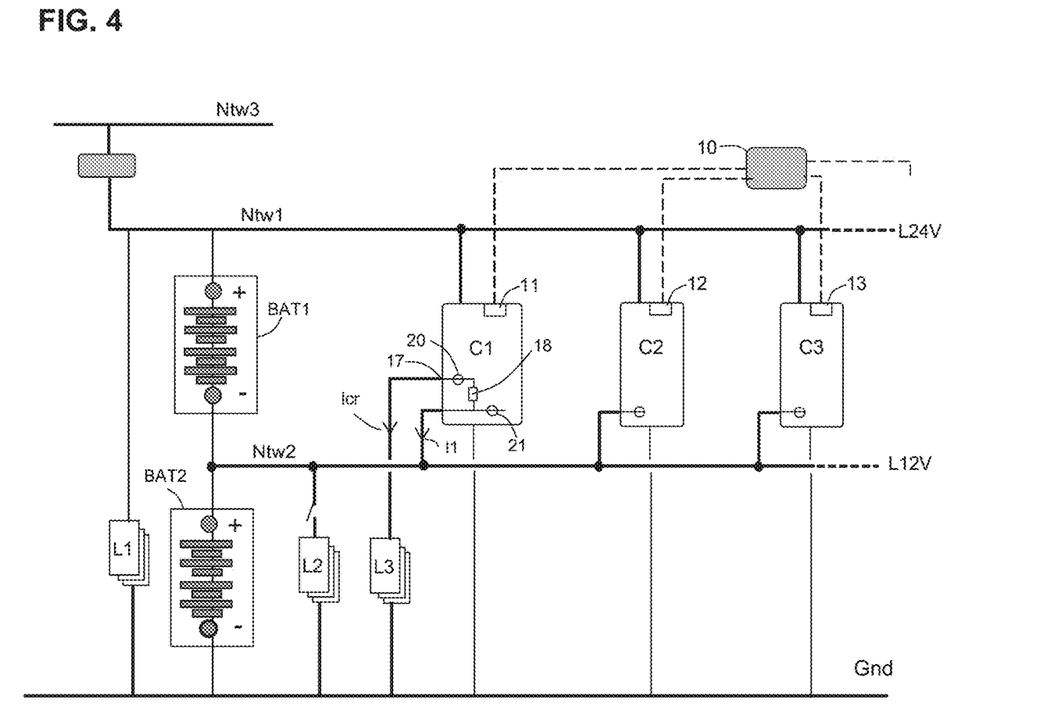
FIG. 4 is analogous to FIG. 1 with another example.

According to a further exemplary implementation, the vehicle might be mainly electrical, with no thermal engine or a series-type hybrid. In such case depicted at FIG. 4, the first network is supplied from an electrical traction battery having a third nominal voltage higher than the first nominal voltage, forming part of a third electrical network Ntw3. The converter system discussed above is also applicable to this case encompassing a hybrid vehicle or a Zero Emission (electrical) vehicle.

Figure 6:
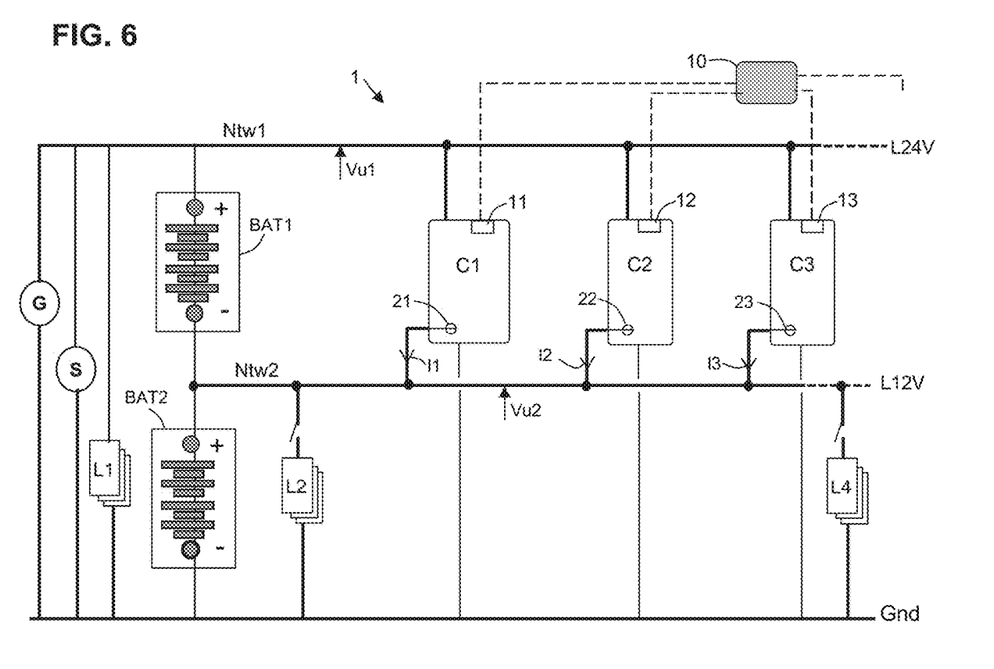
FIG. 6 is analogous to FIG. 1 with another example.

According to a further exemplary implementation, depicted at FIG. 6, the first converter C1 does not carry the shunt circuit. The decision to start the equalising sequence is mainly taken upon the voltage-driven equalization activation condition. The other functions and features are similar or identical to the description of the first example.

MISCELLANEOUS

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

The invention claimed is:

1. A method to control operation of electrical converter units in an electrical system of a vehicle comprising a first electrical network and a second electrical network, the first electrical network being coupled to a positive terminal of a first battery having a first nominal voltage, the second electrical network being coupled to a positive terminal of a second battery having a second nominal voltage lower than the first nominal voltage, wherein the electrical system comprises a plurality of converters with a first converter and one or more further converters,
  wherein each converter of the plurality of converters is supplied from the first electrical network and further comprises a converter output coupled to the second electrical network,
  wherein each converter of the plurality of converters further comprises an active state in which the converter output supplies current to the second electrical network, and a rest state in which the converter output does not supply current to the second electrical network,
  wherein each converter of the plurality of converters exhibits a respective cumulative operation time in each of a plurality of different current ranges, and
  wherein the method further comprises:
    entering a vehicle rest mode with all converters of the plurality of converters in a rest state,
    measuring an instant voltage prevailing at the second electrical network and/or a reference current flowing through a bypass circuit provided in the first converter,
    if the instant voltage prevailing at the second electrical network meets an equalization activation condition or the reference current flowing through the bypass circuit exceeds a first current threshold, then starting an equalizing sequence wherein the first converter changes from the rest state to the active state,
    measuring continuously an instant current supplied to the second electrical network by the plurality of converters, and determining a current range in which the instant current lies, forming thereby a currently active current range,
    if the first converter is not the converter having the least respective cumulative operation time among the plurality of converters in the currently active current range, then stopping the first converter and activating a selected one of the further converters, wherein the selected one of the further converters is chosen to be the one having the least respective cumulative operation time in the currently active current range and becomes the single currently active converter, and
    if the instant current changes from the currently active current range to a further current range, then causing the selected one of the plurality of converters to be the one having the least respective cumulative operation time in the further current range.

2. The method of claim 1, further comprising:
  whenever an outputted current stays in a same current range for more than a predefined time, taking again a decision causing an activation of a selected converter of the plurality of converters having the least respective cumulative operation time in the currently active current range.

3. The method of claim 1, further comprising:
  if an instant current outputted from the currently active converter meets a deactivation criterium, then stopping the equalizing sequence.

4. The method of claim 1, further comprising:
  defining a partition of a max current rating into a plurality of different current ranges, and
  recording a cumulative operation time of each converter in each current range.

5. The method of claim 1, wherein the equalization activation condition is defined as $Vu1-2Vu2>Vth1$, wherein:
  $Vu1$ is an instant voltage prevailing at the first electrical network,
  $Vu2$ is an instant voltage prevailing at the second electrical network, and
  $Vth1$ is a predefined threshold.

6. The method of claim 3, wherein the deactivation criterium is defined as $Ix<Ithdeact$ and $dIx/dt<DeltaIth$, wherein:
  $Ix$ is the instant current ($Ix$) and $dIx/dt$ is the time derivative thereof,
  $Ithdeact$ is a second predefined threshold, and
  $DeltaIth$ is a third predefined threshold.

7. The method of claim 1, wherein each converter of the plurality of converters can be activated or stopped from a master controller.

8. An electrical power supply system for a vehicle comprising a first electrical network and a second electrical network, the first electrical network being coupled to a positive terminal of a first battery having a first nominal voltage, the second electrical network being coupled to a positive terminal of a second battery having a second nominal voltage lower than the first nominal voltage, wherein the electrical system comprises a master controller and a plurality of converters each having a local controller and the plurality of converters comprises a first converter and one or more further converters,
  wherein each converter of the plurality of converters is supplied from the first electrical network and further comprises a converter output coupled to the second electrical network,
  wherein each converter of the plurality of converters further comprises an active state in which the converter output supplies current to the second electrical network, and a rest state in which the converter output does not supply current to the second electrical network, each converter of the plurality of converters exhibiting a respective cumulative operation time in each of a plurality of different current ranges, and
  wherein the local controller and the master controller are further configured to cause under a vehicle rest mode:
    measuring an instant voltage prevailing at the second electrical network and/or a reference current flowing through a bypass circuit provided in the first converter,
    if the instant voltage prevailing at the second electrical network meets an equalization activation condition or the reference current flowing through the bypass circuit exceeds a first current threshold, then starting an equalizing sequence wherein the first converter changes from the rest state to the active state, measuring continuously an instant current supplied to the second electrical network by the plurality of converters, and determining a current range in which the instant current lies, forming thereby a currently active current range, if the first converter is not the converter having the least respective cumulative operation time among the plurality of converters in the currently active current range, then stopping the first converter and activating a selected one of the further converters, wherein the selected one of the further converters is chosen to be the one having the least respective cumulative operation time in the currently active current range and becomes the single currently active converter, and if the instant current changes from the currently active current range to a further current range, then causing the selected one of the plurality of converters to be the one having the least respective cumulative operation time in the further current range.

9. The system of claim 8, further comprising:
whenever an outputted current stays in a same current range for more than a predefined time, taking again a decision causing an activation of a selected converter of the plurality of converters having the least respective cumulative operation time in the currently active current range.

10. The system of claim 8, further comprising:
whenever an instant current outputted from the currently active converter meets a deactivation criterium, stopping the equalizing sequence.

11. The system of claim 8, wherein the first nominal voltage is 24 Volts, and the second nominal voltage is 12 Volts.

12. The system of claim 8, wherein the first network is selectively supplied by an alternator when a vehicle engine is running.

13. The system of claim 8, wherein the first network is selectively supplied from an electrical traction battery having a third nominal voltage higher than the first nominal voltage.

14. The system of claim 8, wherein the local controllers and the master controller communicate via a CAN bus.

15. The system of claim 8, wherein each converter of the plurality of converters can be activated or stopped from the master controller.

16. The system of claim 8, wherein for each converter of the plurality of converters the cumulative usage is calculated as a fatigue function: $\int_0^{now} Ix \cdot F(Ix) \cdot t \cdot dt$, where Ix represents the instant current and the function F reflects a weighting coefficient according to current intensity and associated damage.

17. A vehicle comprising the system of claim 8.

18. A method to control operation of electrical converter units in an electrical system of a vehicle comprising a first electrical network and a second electrical network, the first electrical network being coupled to a positive terminal of a first battery having a first nominal voltage, the second electrical network being coupled to a positive terminal of second battery having a second nominal voltage lower than the first nominal voltage, wherein the electrical system comprises a plurality of converters with a first converter and one or more further converters, wherein each converter of the plurality of converters is supplied from the first electrical network and further comprises a converter output coupled to the second electrical network, wherein each converter of the plurality of converters further comprises an active state in which the converter output supplies current to the second electrical network, and a rest state in which the converter output does not supply current to the second electrical network, wherein each converter of the plurality of converters exhibits a respective cumulative usage, wherein the method further comprises:
entering a vehicle rest mode with all converters of the plurality of converters in a rest state, measuring an instant voltage prevailing at the second electrical network and/or a reference current flowing through a bypass circuit provided in the first converter, if the instant voltage prevailing at the second electrical network meets an equalization activation condition or the reference current flowing through the bypass circuit exceeds a first current threshold, then starting an equalizing sequence wherein the first converter changes from the rest state to the active state, and providing a single converter operation under the equalizing sequence, causing an activation of a single selected converter to have the least respective cumulative usage among the plurality of converters.

19. The method of claim 18, wherein for each converter of the plurality of converters, the cumulative usage is calculated as a fatigue function: $\int_0^{now} Ix \cdot F(Ix) \cdot t \cdot dt$, where Ix represents the instant current and the function F reflects a weighting coefficient according to current intensity and associated damage.

* * * * *